United States Patent
Hsieh et al.

(10) Patent No.: US 9,215,860 B2
(45) Date of Patent: Dec. 22, 2015

(54) FENCE FOR USE BY INFANTS OR PETS

(76) Inventors: Andy Min-Lung Hsieh, Arcadia, CA (US); Bruce Min-Shen Hsieh, Arcadia, CA (US)

(*) Notice: Subject to any disclaimer, the term of this patent is extended or adjusted under 35 U.S.C. 154(b) by 153 days.

(21) Appl. No.: 12/761,422

(22) Filed: Apr. 16, 2010

(65) Prior Publication Data
US 2011/0253963 A1 Oct. 20, 2011

(51) Int. Cl.
| | |
|---|---|
| E04H 17/16 | (2006.01) |
| A01K 1/03 | (2006.01) |
| A01K 3/00 | (2006.01) |
| A47D 13/06 | (2006.01) |

(52) U.S. Cl.
CPC . *A01K 1/034* (2013.01); *A01K 3/00* (2013.01); *A47D 13/066* (2013.01)

(58) Field of Classification Search
USPC .......... 256/24, 25, 26, 27, 67, 65.15, 73; 160/129, 135, 185, 210
See application file for complete search history.

(56) References Cited

U.S. PATENT DOCUMENTS

| | | | | |
|---|---|---|---|---|
| 4,579,473 A | * | 4/1986 | Brugger | 403/163 |
| 4,645,183 A | * | 2/1987 | Rattray et al. | 256/25 |
| 5,291,708 A | * | 3/1994 | Johnson | 256/24 |
| 5,544,870 A | * | 8/1996 | Kelley et al. | 256/26 |
| 5,722,477 A | * | 3/1998 | Richter et al. | 160/135 |
| 5,881,789 A | * | 3/1999 | Melashenko et al. | 160/135 |
| 6,027,104 A | * | 2/2000 | Alexander et al. | 256/25 |
| 6,257,559 B1 | * | 7/2001 | Mouri | 256/26 |
| 2006/0118771 A1 | * | 6/2006 | Stein et al. | 256/24 |
| 2007/0107853 A1 | * | 5/2007 | Hsieh | 160/135 |

* cited by examiner

*Primary Examiner* — Michael P Ferguson
(74) *Attorney, Agent, or Firm* — Kenneth L. Green; Averill & Green

(57) ABSTRACT

The present invention is a device for use by infants or pets which provides a fence for use by infants or pets to confine their activities within a restricted area so that caring of the infants or pets can become easier. The present invention comprises an assembly of fence plates rotatable in relation to each other, wherein the adjacent fence plates are assembled with each other by means of a rotating axle. The fence has a bottom portion which is disposed with fixing members. The present invention assembles a plurality of the fence plates to form a fence. The fence is fixed on the ground by the fixing members to prevent it from sliding. When infants or pets are put into an area restricted by the fence, they can enjoy sufficient rooms for activities. It is also possible to prevent the infants or pets from escaping out of the fence and to confine their activities within a restricted area, thus accidents due to absence of care could be avoided.

8 Claims, 8 Drawing Sheets

FENCE FOR USE BY INFANTS OR PETS

BACKGROUND OF THE INVENTION

The present invention relates generally to a device for use by infants or pets and more specifically relates to a fence for use by infants or pets for confining their activities within a restricted area.

Currently, care of infants is generally limited to cradles and infant chairs by which and within which the activities of infants are confined so that the adults can always keep the infants within their eyesight. However, cradles and infant chairs are only suitable for infants at very young ages, such as those between new-born to 1-year-old, when they are not too active. As the infants grow up and gradually learn to crawl or walk, they need more rooms for activities and so cradles and infant chairs are no longer able to meet their needs. Since the activities of infants cannot be confined within a restricted area, adults have to keep watch over the infants to prevent accidents. Caring of the infants therefore brings much inconvenience to the adults.

The same applies to pets. Many pets are active and they need some rooms for activities. It is common to tie the pet with a rope to confine its activities within a restricted area. This method is effective to a certain extent but the pet may get hurt easily. More specifically, as the rope can be easily tangled up, the pet may even be easily suffocated by the rope. Further, due to the lack of places to tie the rope at outdoors such as a lawn, the caregiver must always grab the rope in order to keep the pet within his/her eyesight. This brings much inconvenience to the caregiver.

BRIEF SUMMARY OF THE INVENTION

In view of the aforesaid disadvantages now present in the prior art, the present invention provides a fence for use by infants or pets to confine their activities within a restricted area so that caring of the infants or pets can become easier.

The above objects are attained by the present invention as follows.

The present invention provides a fence for use by infants or pets which comprises an assembly of fence plates rotatable in relation to each other, wherein the adjacent fence plates are assembled with each other by means of a rotating axle. The fence has a bottom portion which is disposed with fixing members. The present invention assembles a plurality of the fence plates to form a fence. The fence is fixed on the ground by the fixing members to prevent it from sliding. When infants or pets are put into an area restricted by the fence, they can enjoy sufficient rooms for activities. It is also possible to prevent the infants or pets from escaping out of the fence and to confine their activities within a restricted area, thus accidents due to absence of care could be avoided. Since the fence of the present invention is formed by assembling the fence plates, the fence can be easily disassembled and folded for convenient transport and for convenient use even at outdoors.

More specifically, the fixing member is a friction plate or a sharp nail which can be pierced into the ground. The fixing member is disposed at a bottom portion of the rotating axle between the adjacent fence plates.

The rotating axle comprises an axle bush and an axle member, wherein the axle bush is disposed on a side of a fence plate, and the axle member is disposed on a side of an other fence plate which is assembled with the fence plate. The axle bush comprises an upper axle bush which opens upward and a lower axle bush which opens downward. The axle member comprises an upper axle member and a lower axle member which are separated from each other. A positioning means is provided between an upper end of the lower axle member and the lower axle bush. The upper axle member is a sliding axle fitted with the upper axle bush.

The positioning means comprises a positioning block disposed at the upper end of the lower axle member or inside the lower axle bush and a positioning chute disposed inside the lower axle bush or at the upper end of the lower axle member. The upper end of the lower axle member is laterally provided with an opening chute in shape of an inverted Ω. The lower axle member is disposed at a bottom end thereof with an installation orifice for installing the fixing member.

In the fence for use by infants or pets provided by the present invention, each of the fence plates is disposed with the axle bush on one side and the axle member on an other side so that the fence plates can be assembled with each other to form an open structure or a closed structure.

The present invention is simple in structure, space saving when folded, convenient for transport, and suitable for use indoors and outdoors. The present invention also provides different kinds of fixing members for indoor and outdoor uses respectively. Depending on actual circumstances, the size of the area enclosed by the fence of the present invention may vary by assembling different number of fence plates. The fence is therefore adaptable to the actual use environment and the adaptability of the fence is high. The present invention provides an ideal solution to problems associated with the rooms for activities of infants or pets, thereby easing the pressure of adults and facilitating the healthy growth of infants and pets by offering them proper and sufficient rooms for activities. The present invention possesses substantive characteristics and improvement in comparison with the prior art.

DETAILED DESCRIPTION OF THE INVENTION

The present invention is further explained in the following with reference to the accompanying drawings.

Figure 1:
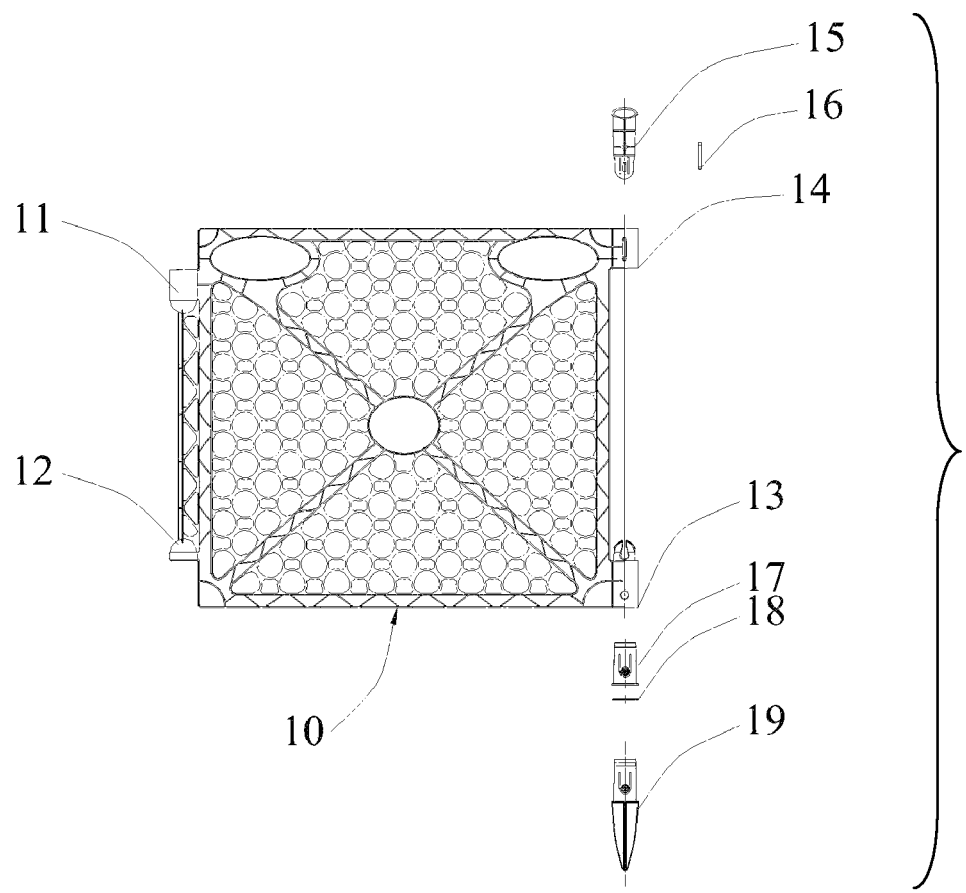
FIG. 1 illustrates the structure of a fence plate of the present invention.

FIG. 1 illustrates a fence plate 10, one side of which is disposed with an axle bushing comprising an upper axle bushing 11 including a downward concave opening and a lower axle bushing 12 including an upward concave opening, an opposite side of which is disposed with an axle guide comprising an lower axle guide 13 and an upper axle guide 14 which are separated from each other. The lower axle guide 13 is disposed at a bottom portion thereof with an installation orifice for installing a fixing member. The fixing member is either a friction plate 18 or a sharp nail (or stake) 19 which can be pierced into the ground which is disposed at a bottom portion of an installation member 17. The upper axle guide 14 is disposed with a sliding axle 15 which is restricted by a lateral axle 16 to slide within the upper axle guide 14 and fitted with an upper axle bushing of an other fence plate. The fence plate 10 is opened with a mesh of through holes with two larger grabbing holes opened at its upper part for infants to grab and for easy carrying.

Figure 2:
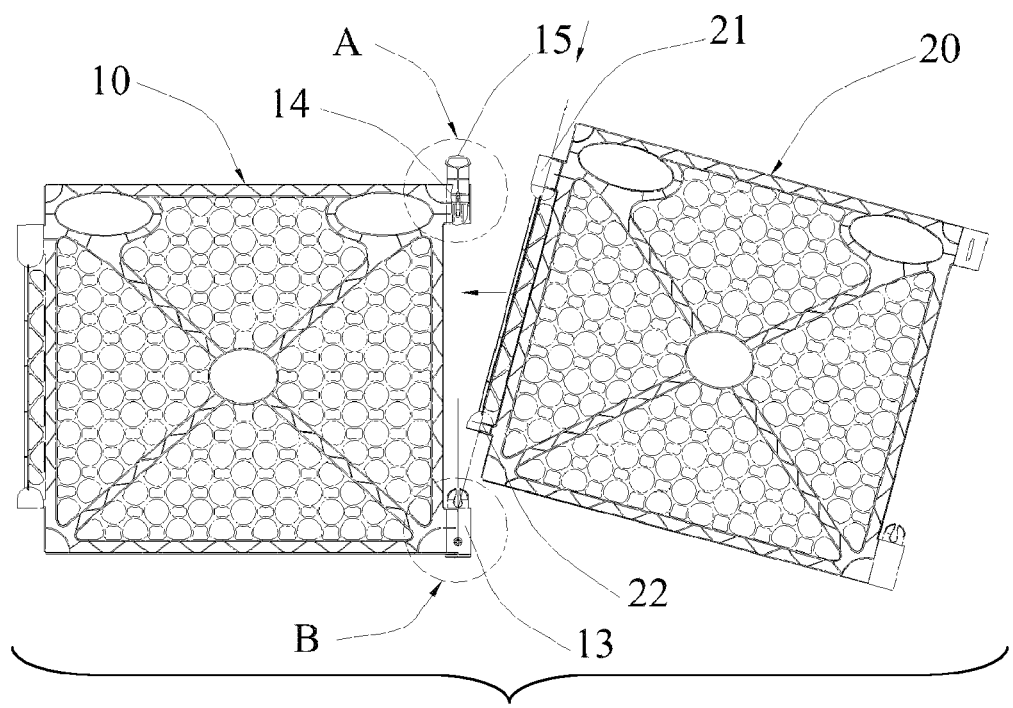
FIG. 2 illustrates the assembled structure of the present invention.
Figure 8:
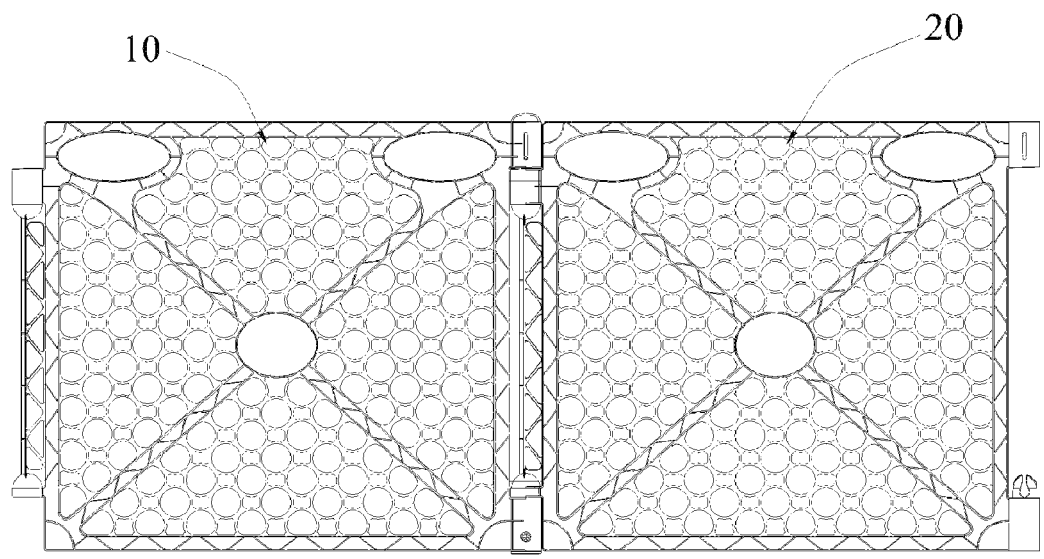
FIG. 8 illustrates the structure of the present invention when it is assembled.

As shown in FIG. 2, to assemble two fence plates, pull up the sliding axle 15 of the axle guide on one side of the fence plate 10 first, and simultaneously insert the lower axle bushing 22 of the other fence plate 20 into the lower axle guide 13 of the fence plate 10, as shown by the arrows of FIG. 2. Then, align the upper axle bushing 21 of the other fence plate 20 with the upper axle guide 14 of the fence plate 10, and finally release the sliding axle 15 to complete the assembly as shown in FIG. 8.

Figure 3:
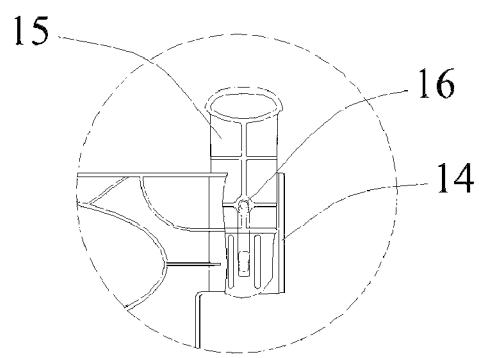
FIG. 3 is the enlarged illustration of part A in FIG. 2.
Figure 4:
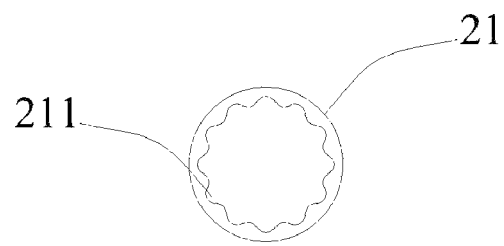
FIG. 4 illustrates the inner structure of the upper axle bushing.
Figure 5:
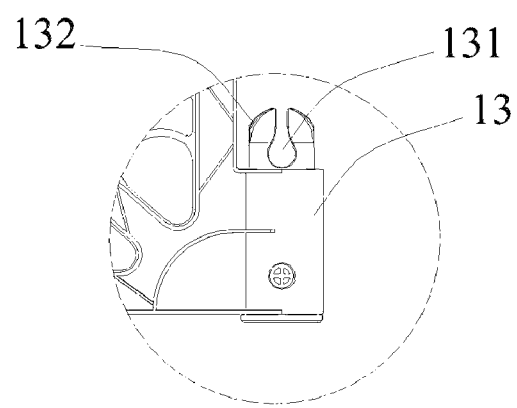
FIG. 5 is the enlarged illustration of part B in FIG. 2.
Figure 6:
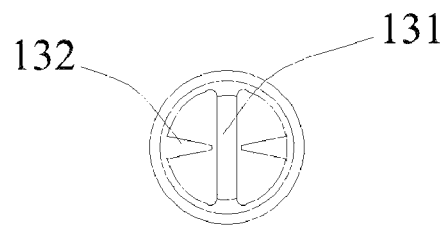
FIG. 6 is the top view of the lower axle member.
Figure 7:
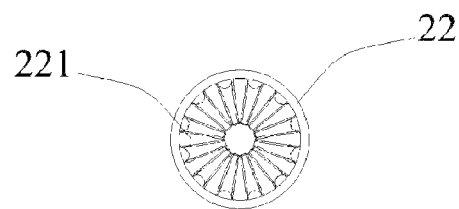
FIG. 7 illustrates the inner structure of the lower axle bushing.
Figure 9:
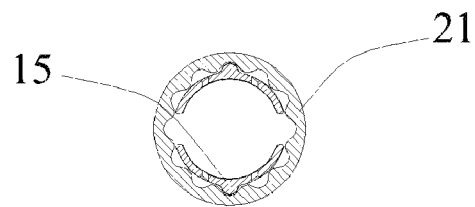
FIG. 9 is a sectional view of the upper axle bushing when the present invention is assembled.
Figure 10:
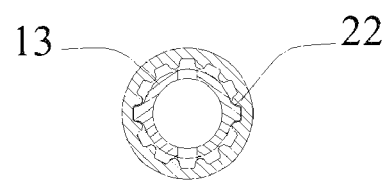
FIG. 10 is a sectional view of the lower axle bushing when the present invention is assembled.
Figure 11:
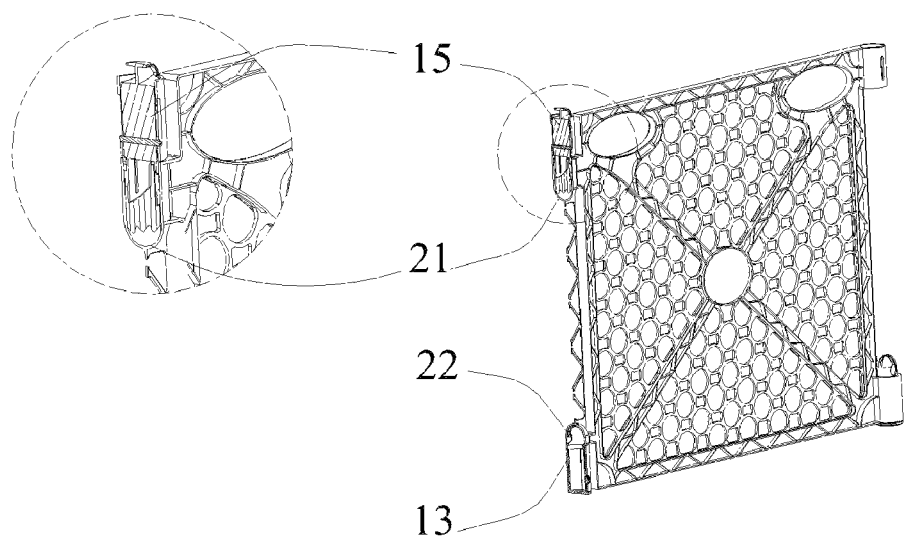
FIG. 11 is a sectional view of the structure of the present invention when it is assembled.
Figure 12:
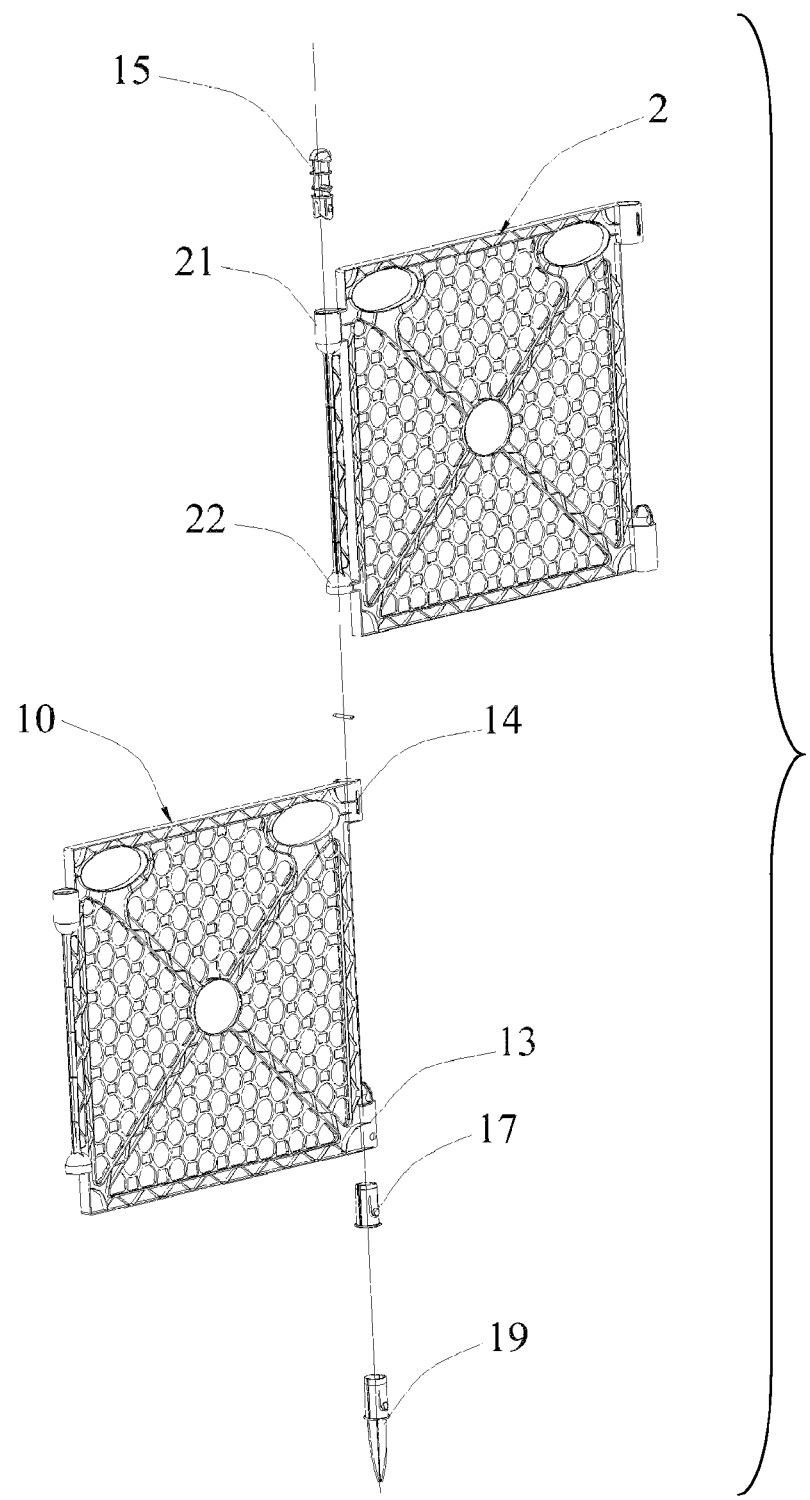
FIG. 12 illustrates the assembled structure of the present invention in perspective view.

Specific fitting structure of the fence plates is shown by an enlarged cross-sectional view in FIG. 3. The upper axle guide 14 is in form of an axle hole with a sliding chute opened on one side thereof. The sliding axle 15 is inserted into the upper axle guide 14 and restricted to slide up and down along the sliding chute of the upper axle guide 14 by means of the lateral axle 16. As shown in FIG. 4, the inner wall of the upper axle bushing 21 of the other fence plate 20 is circumferentially disposed with notches 211 for interlocking with the sliding axle 15. The upper end of the lower axle guide 13 is disposed with an opening chute 131 in shape of an inverted .OMEGA. positioned laterally and positioning blocks 132 are disposed opposite to the opening chute 131 in a symmetrical manner, as shown in FIG. 5. The inner wall of the lower axle bushing 22 of the other fence plate 20 is radially disposed with positioning chutes 221 for fitting with the positioning blocks 132. The assembled structure is shown in FIG. 9 and FIG. 10. More detailed illustration of the structure shown in FIG. 9 and FIG. 10 is shown in FIG. 11 and FIG. 12.

Figure 13:
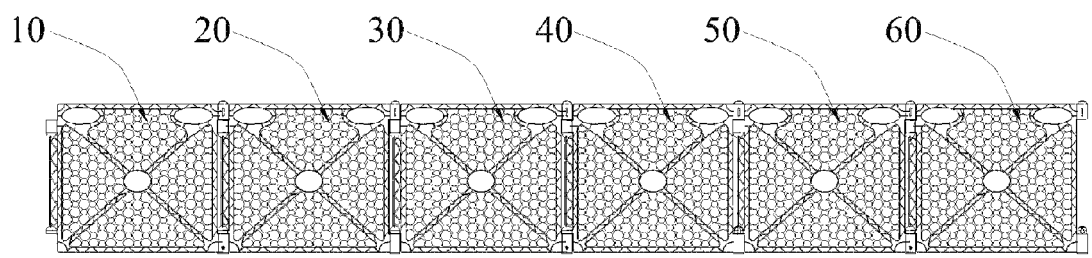
FIG. 13 illustrates a first embodiment of the assembled structure of the present invention.
Figure 14:
FIG. 14 illustrates the structure of FIG. 13 when it is folded.
Figure 15:
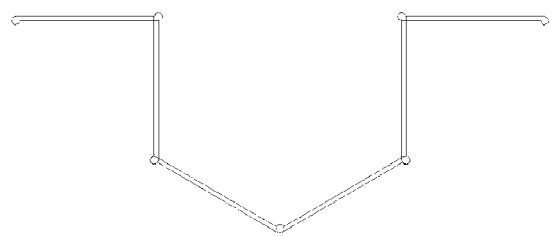
FIG. 15 illustrates a first state of use of the present invention in FIG. 13.
Figure 16:
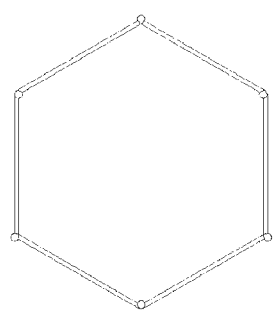
FIG. 16 illustrates a second state of use of the present invention in FIG. 13.

As shown in FIG. 13, the present invention can be formed by assembling six fence plates 10, 20, 30, 40, 50, 60 of the same structure, and the assembled structure when unfolded is an extensively long structure. However, as shown in FIG. 14, when the assembled structure is folded, it can be very small and thus very convenient for carrying. Each pair of the adjacent fence plates can rotate in relation to each other and therefore the fence can be erected in different shapes, such as an open one as shown in FIG. 15 or a closed one as shown in FIG. 16.

Figure 17:
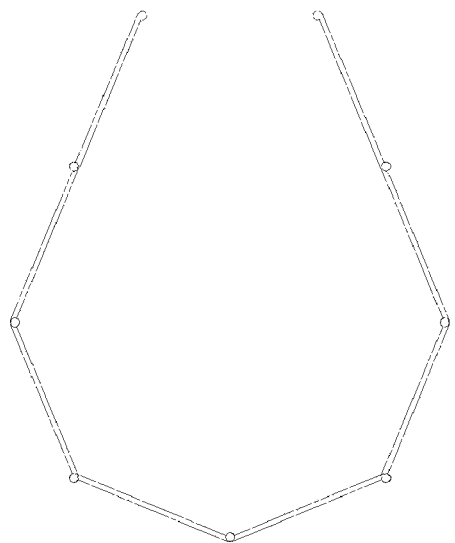
FIG. 17 illustrates a first state of use of a second embodiment of the assembled structure of the present invention.
Figure 18:
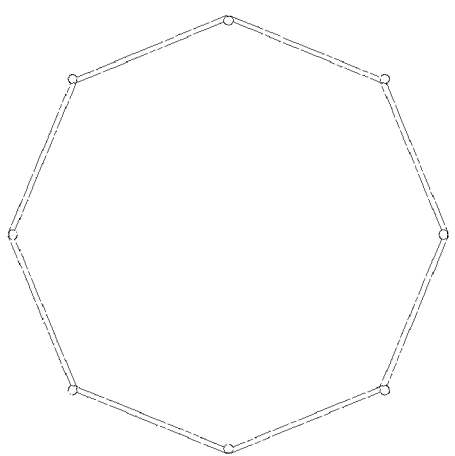
FIG. 18 illustrates a second state of use of the present invention in FIG. 17.

The structure of the present invention is not limited to a specific number of fence plates. The number of fence plates may vary according to the area needed to be enclosed in practice, for example, eight fence plates can be used as shown in FIGS. 17 and 18.

What is claimed is:

1. A fence for use by infants or pets, the fence comprising:
at least two fence plates rotatable connected;
a lower bushing residing proximal to a first bottom of a first side of each fence plate;
an upper bushing residing proximal to a first top of the first side of each fence plate;
a lower axle guide residing proximal to a second bottom of a second side opposite to the first side of each fence plate;
an upper axle guide residing proximal to a second top of the second side of each fence plate;
an upward concave opening in each lower bushing;
a positioning block fixedly upwardly extending from each lower axle guide;
the upward concave opening in the lower bushing of each fence plate is configured to slide down over the positioning block of another one of the at least two fence plates;
a sliding axle vertically slidable, residing in each upper axle guide;
a horizontal projection fixed to the sliding axle and residing in a vertical slot in the upper axle guide, the horizontal projection cooperating with the upper axle guide to limit the sliding axle to reside between a raised position in the upper axle guide and a lowered position in the upper axle guide, wherein:
in the raised position of the sliding axle of a first one of the at least two fence plates, the upward concave opening in the lower bushing of a second one of the at least two fence plates is positionable over the positioning block of the first one of the at least two fence plates and the second one of the at least two fence plates is then pivotable about the positioning block of the first one of the at least two fence plates to align the upper bushing of the second one of the at least two fence plates with the sliding axle of the first one of the at least two fence plates; and
in the lowered position of the sliding axle of the first one of the at least two fence plates, the sliding axle of the first one of the at least two fence plates resides in the upper bushing of the second one of the at least two fence plates retaining the upward concave opening of the lower bushing of the second one of the at least two fence plates over the positioning block of the first one of the at least two fence plates, wherein the first and second fence plates are assembled.

2. The fence of claim 1, wherein the positioning blocks each include an opening chute, the opening chute reaching upward forming a vertically open slot in the positioning block.

3. The fence of claim 1, wherein the horizontal projection is a lateral axle engaging each sliding axle and respective upper axle guide and limits vertical movement of the sliding axle in the upper axle guide.

4. The fence of claim 3, wherein the lateral axle is fixedly horizontally attached to the sliding axle and slidably engages the vertical slot in the upper axle guide.

5. The fence of claim 1, wherein the lower axle guides each include an upward concave passage having an open bottom, and a positioning spike is insertable into the upward concave passage, the spike insertable into soil to fix a position of the fence plates.

6. The fence of claim 1, wherein the lower axle guides each include an upward concave passage having an open bottom, and an installation member is insertable into the upward concave passage, a friction plate attachable to the installation member to resist moving the fence plates.

7. A fence for use by infants or pets, the fence comprising:
   at least two fence plates rotatable connected;
   a lower bushing residing proximal to a first bottom of a first side of each fence plate;
   an upper bushing residing proximal to a first top of the first side of each fence plate;
   a lower axle guide residing proximal to a second bottom of a second side opposite to the first side of each fence plate;
   an upper axle guide residing proximal to a second top of the second side of each fence plate;
   an upward concave opening in each lower bushing;
   a positioning block fixedly upwardly extending from each lower axle guide;
   the upward concave opening in the lower bushing of each fence plate being configured to slide down over the positioning block of another one of the at least two fence plates;
   a sliding axle vertically slidable, residing in each upper axle guide;
   a lateral axle fixedly horizontally attached to each sliding axle and slidably engaging a vertical slot in the upper axle guide, the lateral axle limiting vertical movement of the sliding axle in the upper axle guide between a raised position in the upper axle guide and a lowered position in the upper axle guide, wherein:
   in the raised position of the sliding axle of a first one of the at least two fence plates, the upward concave opening in the lower bushing of a second one of the at least two fence plates is positionable over the positioning block of the first one of the at least two fence plates and the second one of the at least two fence plates is then pivotable about the positioning block of the first one of the at least two fence plates to align the upper bushing of the second one of the at least two fence plates with the sliding axle of the first one of the at least two fence plates; and
   in the lowered position of the sliding axle of the first one of the at least two fence plates, the sliding axle of the first one of the at least two fence plates resides in the upper bushing of the second one of the at least two fence plates retaining the upward concave opening of the lower bushing of the second one of the at least two fence plates over the positioning block of the first one of the at least two fence plates, wherein the first and second fence plates are assembled.

8. A fence for use by infants or pets, the fence comprising:
   at least two fence plates rotatable connected;
   a lower bushing residing proximal to a first bottom of a first side of each fence plate;
   an upper bushing residing proximal to a first top of the first side of each fence plate;
   a lower axle guide residing proximal to a second bottom of a second side opposite to the first side of each fence plate;
   an upper axle guide residing proximal to a second top of the second side of each fence plate;
   an upward concave opening in each lower bushing;
   a positioning block fixedly upwardly extending from each lower axle guide;
   the upward concave opening in the lower bushing of each fence plate being configured to slide down over the positioning block of another one of the at least two fence plates;
   a sliding axle vertically slidable, residing in each upper axle guide;
   a lateral axle fixedly horizontally attached to each sliding axle and slidably engaging a vertical slot in the upper axle guide, the lateral axle limiting vertical movement of the sliding axle in the upper axle guide between a raised position in the upper axle guide and a lowered position in the upper axle guide, wherein:
   in the raised position of the sliding axle of a first one of the at least two fence plates, the upward concave opening in the lower bushing of a second one of the at least two fence plates is positionable over the positioning block of the first one of the at least two fence plates and the second one of the at least two fence plates is then pivotable about the positioning block of the first one of the at least two fence plates to align the upper bushing of the second one of the at least two fence plates with the sliding axle of the first one of the at least two fence plates; and
   in the lowered position of the sliding axle of the first one of the at least two fence plates, the sliding axle of the first one of the at least two fence plates resides in the upper bushing of the second one of the at least two fence plates retaining the upward concave opening of the lower bushing of the second one of the at least two fence plates over the positioning block of the first one of the at least two fence plates, wherein the first and second fence plates are assembled;
   an upward concave passage in each of the lower axle guides;
   an installation member insertable into each upward concave passage; and
   a friction plate attachable to the installation member to resist moving the fence plates.

\* \* \* \* \*